(12) United States Patent
Coutts et al.

(10) Patent No.: US 9,498,930 B2
(45) Date of Patent: Nov. 22, 2016

(54) PACKAGING ROLL STOCK WITH WINDOWS

(75) Inventors: David A. Coutts, North York (CA);
Donald B. Hilder, Zephyr (CA);
Andrew G. Pattenden, Newmarket (CA); Andrew F. Valy, Etobicoke (CA)

(73) Assignee: Genpak LP, Aurora, Ontario (CA)

( * ) Notice: Subject to any disclaimer, the term of this patent is extended or adjusted under 35 U.S.C. 154(b) by 1454 days.

(21) Appl. No.: 11/486,784

(22) Filed: Jul. 14, 2006

(65) Prior Publication Data
US 2008/0014391 A1   Jan. 17, 2008

(51) Int. Cl.
| B31B 19/82 | (2006.01) |
|---|---|
| B32B 27/10 | (2006.01) |
| B32B 38/04 | (2006.01) |
| B65D 33/04 | (2006.01) |
| B32B 27/08 | (2006.01) |
| B29D 22/00 | (2006.01) |
| B32B 27/30 | (2006.01) |
| B32B 27/32 | (2006.01) |
| B32B 3/26 | (2006.01) |
| B32B 37/15 | (2006.01) |
| B32B 37/20 | (2006.01) |

(52) U.S. Cl.
CPC ............ B31B 19/82 (2013.01); B29D 22/003 (2013.01); B32B 3/266 (2013.01); B32B 27/08 (2013.01); B32B 27/10 (2013.01); B32B 27/306 (2013.01); B32B 27/308 (2013.01); B32B 27/32 (2013.01); B32B 38/04 (2013.01); B65D 33/04 (2013.01); *B31B 2219/9038* (2013.01); *B32B 37/153* (2013.01); *B32B 37/203* (2013.01); *B32B 2038/042* (2013.01); *B32B 2307/414* (2013.01); *B32B 2309/02* (2013.01); *B32B 2439/06* (2013.01); *Y10T 428/1352* (2015.01); *Y10T 428/24322* (2015.01)

(58) Field of Classification Search
CPC ..... B65D 33/04; B65D 33/004; C08F 10/00; B31B 2221/10; B31B 19/82; B31B 2219/9038; B32B 27/32; B32B 27/10; B32B 38/04; B32B 27/08; B32B 27/306; B32B 27/308; B32B 3/266; B32B 37/153; B32B 37/203; B32B 2038/042; B32B 2307/414; B32B 2309/02; B29D 22/003; Y10T 428/24322; Y10T 428/1352
USPC ........................................... 229/303; 383/106
See application file for complete search history.

(56) References Cited

U.S. PATENT DOCUMENTS

| 1,770,865 | A | * | 7/1930 | Royal | 493/220 |
|---|---|---|---|---|---|
| 2,158,755 | A | * | 5/1939 | Hodgdon et al. | 428/191 |
| 2,577,249 | A | | 12/1951 | Jenett | |

(Continued)

FOREIGN PATENT DOCUMENTS

| CA | 1192824 | 9/1985 |
|---|---|---|
| CA | 2230810 | 8/1999 |

(Continued)

*Primary Examiner* — Peter Helvey
(74) *Attorney, Agent, or Firm* — McCarter & English, LLP

(57) ABSTRACT

A process for manufacturing a laminate is disclosed. The laminate is for forming a package having one or more windows for viewing the contents of said package. The process comprises the step of extrusion laminating, onto a first material perforated by a hole for and defining each of said windows, a heat-sealable second material. A laminate produced by the process is also disclosed. A heat-sealed package produced with the laminate is also disclosed.

11 Claims, 3 Drawing Sheets

(56) References Cited

U.S. PATENT DOCUMENTS

| | | | |
|---|---|---|---|
| 2,745,593 A * | 5/1956 | Brady | 383/14 |
| 2,752,085 A * | 6/1956 | Bryce | 383/106 |
| 3,038,651 A * | 6/1962 | Cloudsley | 383/208 |
| RE28,554 E | 9/1975 | Curler et al. | |
| 4,071,674 A * | 1/1978 | Kashiwa et al. | 526/124.8 |
| 4,265,949 A * | 5/1981 | Kugimiya | 383/106 |
| 4,341,825 A * | 7/1982 | Kemski | 206/484 |
| 4,382,539 A * | 5/1983 | Kronman | 229/302 |
| 4,407,689 A | 10/1983 | Ohtsuki et al. | |
| 4,458,466 A * | 7/1984 | Carbone et al. | 53/390 |
| 4,461,661 A * | 7/1984 | Fabel | 156/70 |
| 4,657,614 A | 4/1987 | Andersson | |
| 4,793,609 A * | 12/1988 | Coutts et al. | 482/122 |
| 4,935,276 A | 6/1990 | Pawlowski et al. | |
| 4,991,980 A | 2/1991 | Cohen et al. | |
| 5,009,518 A | 4/1991 | Faltynek | |
| 5,127,743 A | 7/1992 | Miller et al. | |
| 5,326,575 A | 7/1994 | Spaulding | |
| 5,346,764 A * | 9/1994 | Kudo et al. | 428/349 |
| 5,365,720 A * | 11/1994 | Bunch | 53/411 |
| 5,410,857 A | 5/1995 | Utley | |
| 5,465,842 A | 11/1995 | Utley | |
| 5,863,576 A * | 1/1999 | Guarino | 426/107 |
| 5,894,947 A * | 4/1999 | Morano | 215/11.3 |
| 6,033,114 A * | 3/2000 | Grimm et al. | 383/106 |
| 6,080,478 A | 6/2000 | Karhuketo | |
| 6,187,396 B1 * | 2/2001 | Moller | 428/34.3 |
| 6,190,741 B1 * | 2/2001 | Miranda | 427/536 |
| 6,846,551 B2 * | 1/2005 | Genske et al. | 428/216 |
| 6,988,829 B2 * | 1/2006 | Bareis et al. | 383/103 |
| 7,001,370 B2 * | 2/2006 | Kubalak et al. | 604/544 |
| 7,578,428 B2 * | 8/2009 | Charlton | 229/164.1 |
| 2002/0088730 A1 * | 7/2002 | Galomb | 206/459.5 |
| 2002/0141666 A1 * | 10/2002 | Kuge | 383/106 |
| 2003/0130646 A1 * | 7/2003 | Kubalak et al. | 604/544 |
| 2004/0091668 A1 * | 5/2004 | Weder et al. | 428/141 |
| 2004/0134125 A1 * | 7/2004 | Weder | 47/72 |
| 2004/0175517 A1 | 9/2004 | Pockat et al. | |
| 2005/0023178 A1 * | 2/2005 | Surattee et al. | 206/524.4 |
| 2005/0041894 A1 * | 2/2005 | Hanson | 383/120 |
| 2006/0014036 A1 | 1/2006 | Kendig et al. | |

FOREIGN PATENT DOCUMENTS

| | | |
|---|---|---|
| EP | 0 546 792 A1 | 6/1993 |
| EP | 0 974 450 A2 | 1/2000 |

* cited by examiner

PACKAGING ROLL STOCK WITH WINDOWS

FIELD OF THE INVENTION

The invention relates to materials used for packaging, processes for the manufacture thereof and packages produced thereby.

BACKGROUND OF THE INVENTION

Combinations containing films are commonly used for packages product such as foodstuffs, medical and pharmaceutical products, electronic products and others. These combinations generally comprise at least one layer of non-transparent material such as aluminum foil, metalized polymer film, paper or the like. These combinations often also comprise films of polyethylene, polypropylene, polyester or the like, layered on one or both sides of the non-transparent material.

One popular packaging combination consists of a layer of paper having adhesive-laminated thereto a clear heat-sealable plastic layer. The paper portion of the laminate is die-cut prior to lamination, to provide windows to view the contents of packages formed therewith. When forming a bag with this material, it is usually necessary to apply a hot melt or other adhesive on the paper/plastic back seam, and on the paper/plastic interface at the bottom of the bag.

Due to the manufacturing complexity associated with the application of adhesive on the bag back seam and bottom, it is conventional to sell pre-made bags to processors, for subsequent filling and closure. The use of pre-made bags is relatively expensive. Also, the use of adhesive lamination can result in gaps between the layers of the finished material, which gaps render the material prone to delamination, loss of barrier and insect infestation. Voids are also prone to occur where the window meets the paper. Yet further, these bags are typically not hermetically sealed.

Another popular material comprises a layer of non-transparent, heat-sealable material. Materials of this type can be used in form-fill-seal machines, of the type for producing stand-up pouches and other packages, which is advantageous to processors in terms of cost. Also advantageous, these packages are generally hermetically sealed. However, these packages suffer in terms of consumer acceptance, as consumers cannot view the contents thereof.

SUMMARY OF THE INVENTION

A process for manufacturing a laminate forms one aspect of the invention. The laminate is for forming a package having one or more windows for viewing the contents of said package. This process comprises the step of extrusion laminating, onto a first material perforated by a hole for and defining each of said windows, a heat-sealable second material.

A laminate for forming a package forms another aspect of the invention. The package has one or more windows for viewing the contents of said package. This laminate comprises a layer of a first material, a layer of a second material and a layer of thermoplastic. The layer of first material has formed therein a hole for and defining each of said one or more windows. The layer of second heat-sealable plastic material is spaced from the layer of first material. The layer of thermoplastic has been deposited by extrusion between the layer of first material and the layer of second material in a manner such that the windows are hermetically sealed by plastic through which the contents of a package produced from the laminate can be viewed.

A heat-sealed package forms another aspect of the invention. This package comprises an outer layer, an inner layer and an intermediate layer of thermoplastic. The outer layer is of a first material, and has formed therein one or more holes. The inner layer is of heat-sealable second plastic material and is spaced from the outer layer. The intermediate layer of thermoplastic has been deposited by extrusion between the inner and outer layers such that the holes are hermetically sealed by plastic through which the contents of the package can be viewed.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawing, the latter being briefly described hereinafter.

DETAILED DESCRIPTION

Figure 3:
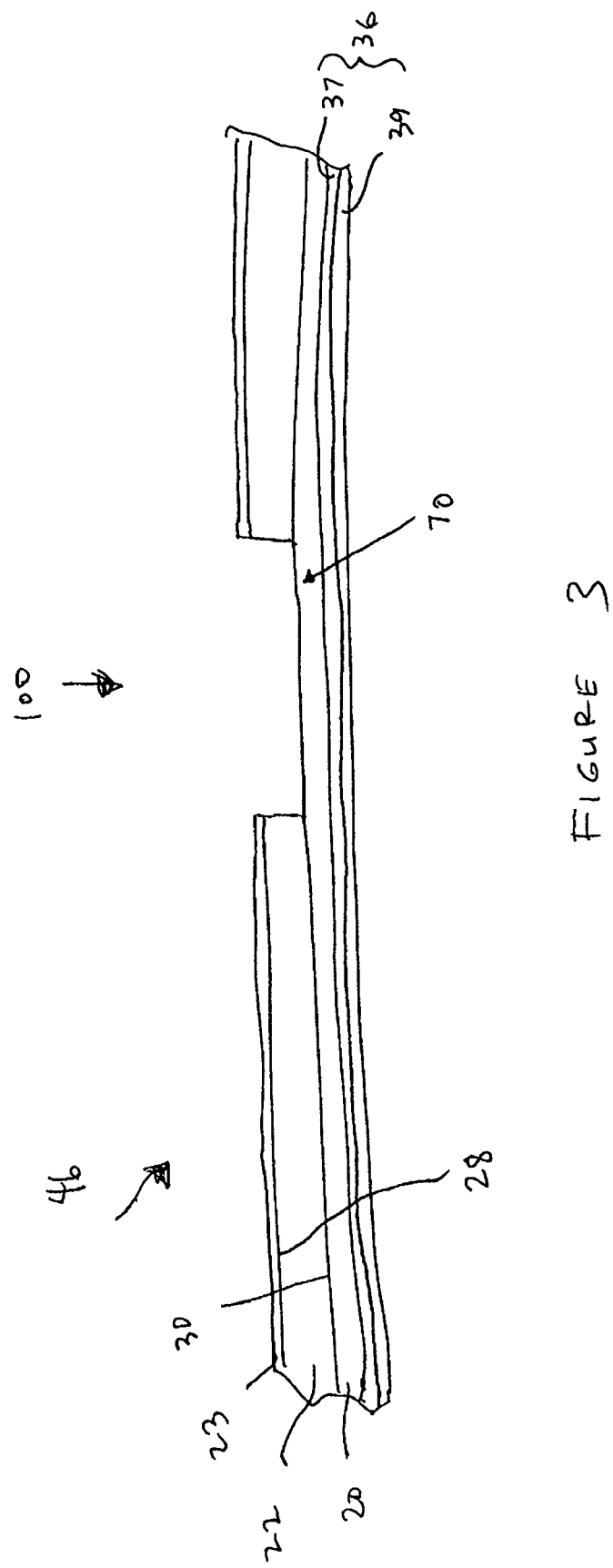
FIG. 3 is a schematic cross-sectional view of the laminate formed by the process of FIG. 1.

Reference is made first to FIG. 3 which depicts schematically a laminate 46 forming one preferred embodiment of the invention. This laminate 46 includes a first material 22, namely, 65 gsm (gram per square meter) coated bleached glossy paper, having a print-bearing face 28 and an opposing face 30. The print, deposited by Flexography, is indicated schematically by thin layer 23. Material 22 is perforated by a hole indicated with general reference numeral 70. The print 23 comprises synchronization marks (not shown). This laminate 46 also includes a second material 36. This second material 36 comprises a 110 gauge (26 micron) transparent barrier 37 film sold by Exxon Mobil as product 110AXT under the trade-mark BICOR, which has been laminated, by a solvent-based adhesive, to a 1 mm transparent sealant film 39 sold by Pliant Corporation as product IO29. The sealant film 39 is orientated to present away from paper 22, so as to render the second material 36 heat-sealable. This laminate 46 also includes an intermediate layer of LDPE 20.

Figure 1:
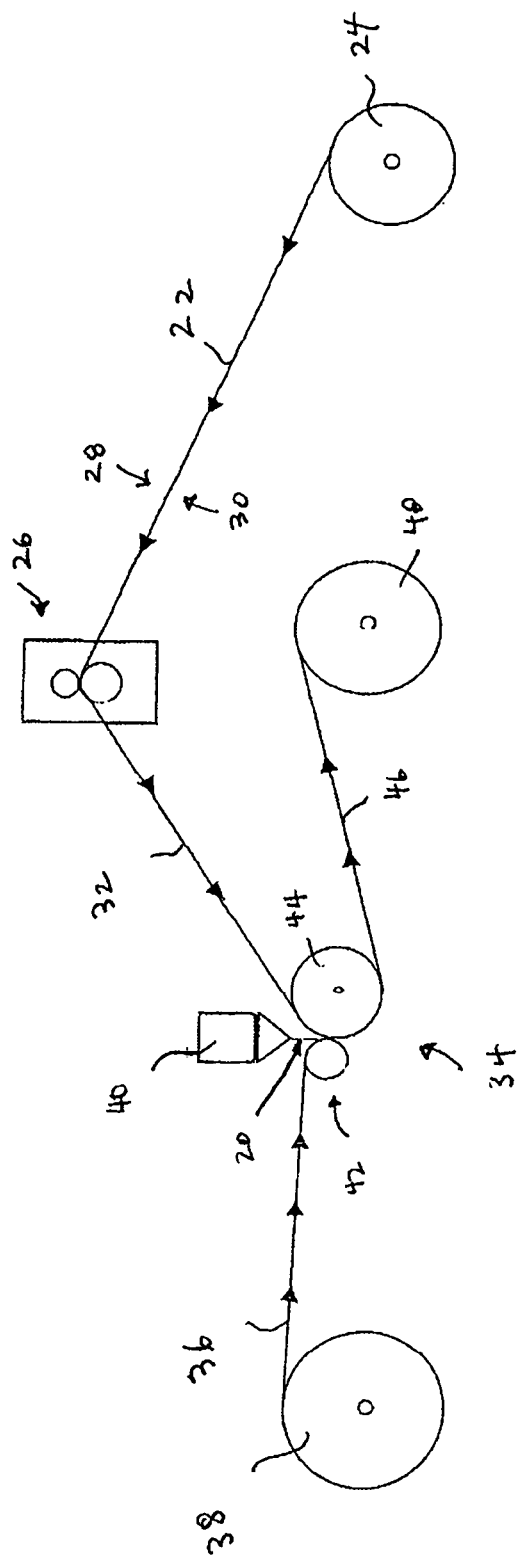
FIG. 1 is a schematic of a process for manufacturing laminate according to a preferred embodiment of the invention.

Attention is now directed to a process for manufacturing this laminate, which process forms another preferred embodiment of the invention and is depicted schematically in FIG. 1.

In this process, the first material 22 is released from a secondary unwind roller 24 and passed through a die cutting unit 26.

In the die cutting unit 26, the synchronization marks are detected by an optical sensor (not shown). Detection of a synchronization mark initiates a punching operation in the die cutting unit 26, such that holes 70 are formed in the first layer material 22 in predetermined locations relative to the synchronization marks, to produce a perforated material 32. The manner in which such detection and die cutting is carried out is well known to persons of ordinary skill in the art, and as such, is not described in detail herein.

The perforated material 32 advances next to a laminating section 34, along with the second material 36 that has been released from a primary unwind roller 38.

In the laminating section 34, an extruder 40 applies a 11.5 gsm layer of an extrudant 20 onto the barrier film 37 portion of the second material 36 before the barrier film portion 37 of the second material 36 is overlaid upon the opposing face 30 of the first material 22 and laminated thereto by passage through a nip-roller 42, to produce laminate 46. The laminant extrudate 20 in this process is LDPE applied at a curtain temperature of 300° C., and forms intermediate layer 20 shown in FIG. 3.

In this process, the laminator 34 includes a chill roll 44 bearing a mirror pocket finish (not shown), so as to facilitate smooth release of the laminate 46 therefrom.

This laminate 46 is then advanced to rewind roller 48, and spooled for subsequent use.

Figure 2:
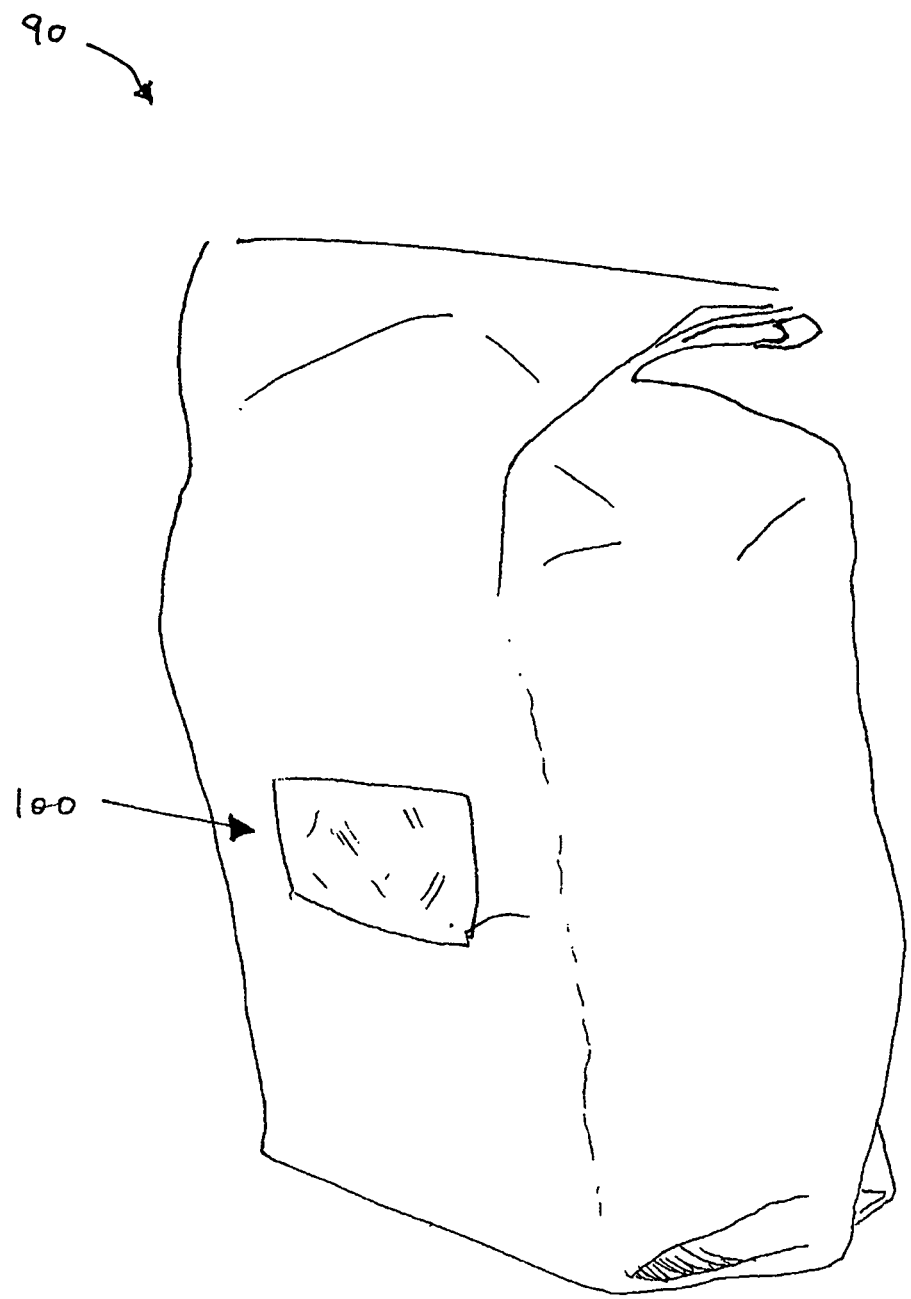
FIG. 2 is a perspective view of a package formed with the laminate formed by the process of FIG. 1.

FIG. 2 shows such a subsequent use, namely, a hermetically-sealed bag or pouch 90 made from laminate 46 by a conventional vertical form-fill-seal machine. As illustrated, the pouch or package 90 has a window 100 for viewing its contents. This window 100 is not fully transparent, but rather is slightly translucent, owing to the chill roll 44 texture. The degree of opacity/translucence of window 100 is such that the contents of the package can be viewed through the window 100, so as to permit potential consumers to readily inspect the contents, while at the same time facilitating smooth release of the laminate 46 from the chill roll 44. It is noted that, in this bag, the paper first material 22 forms the bag outer layer, whereas the second material 36 forms the inner layer.

The specific package 90 described hereinbefore is known to be useful for the packaging of tortilla chips, but could be used for other purposes.

Whereas a specific process, laminate and package produced thereby are herein described, it should be understood that various changes to the process, laminate and package produced thereby can be made.

Firstly, whereas a 65 gsm paper is herein described to be utilized, paper stocks of other weights can be utilized. For example, weights of the type normally utilized in packaging, to wit, between 20 gsm and 120 gsm, are known to be useful. As well, whereas a bleached, glossy finish paper is described, natural and other papers can be used, as can matte and other finishes. Additionally, materials other than paper, such as plastics, metal foils or laminates thereof can be utilized.

Further, whereas a print deposited by Flexography is herein described, other printing processes, such as rotogravure, lithography and others can readily be employed.

Moreover, the print could be deposited on the first layer material either prior to forming the holes or subsequent thereto. A print could also be omitted.

As well, whereas the laminate extrudate in the described process is LDPE, other thermoplastics, including but not limited to PE, LLDPE, MDPE, EVA, EMA, EAA and HDPE could be utilized. As is readily understood by persons of ordinary skill in the packaging arts, modification of the extrudate composition may compel alteration of the curtain temperature, so as to ensure that the extrudate both flows and bonds properly to the first and second layer materials. Whereas a 11.5 gsm layer of extrude is hereinbefore described, this may be modified, to, inter alia, meet the specific performance requirements of the product to be packaged. Weights between 3 and 40 gsm are known to be useful.

Additionally, whereas a specific laminated transparent film is described as forming the second material, other heat-sealable films may be employed. For example, barrier properties may, in some cases, not be required. Other weights and compositions could also be employed. Of course, barrier films other than AXT, and sealant films other than IO29, could readily be utilized. As well, lamination techniques other than solvent-based could be utilized, and monolithic films (i.e. non-laminated films) could be employed as the second material.

Further, whereas the print is indicated to include synchronization marks for the purposes of window positioning, these synchronization marks, or other syncronization marks, can be used at a later processing stage for cutting the packaging materials in appropriate places to form unit packages.

Further still, whereas die cutting is taught, other cutting apparatus, such as laser cutting or water jet cutting, could be employed.

Additionally, whereas the bag illustrated was formed by a vertical form-fill-seal machine, laminates constructed according to the invention can be utilized in horizontal form-fill-seal machines as well.

Finally, whereas a textured chill roll is described, which facilitates removal of the laminate from the nip roller, untextured i.e. smooth-finished rollers can also be utilized, to produce laminate with substantially transparent windows, although this may have deleterious impacts on lamination throughput.

Accordingly, it should be understood that the invention is to be limited only by the claims appended hereto, purposively construed.

What is claimed is:

1. A laminate for forming a package having one or more windows for viewing the contents of said package, said laminate comprising:
   a layer of a first material having formed therein a hole for and defining each of said one or more windows;
   a layer of a second heat-sealable plastic material spaced from the layer of the first material; and
   a layer of extruded thermoplastic between the layer of the first material and the layer of the second heat-sealable plastic material such that the one or more windows are hermetically sealed by plastic;
   wherein the layer of extruded thermoplastic extends on top of the layer of the second heat-sealable plastic material to: (i) continuously connect the first and second layers, (ii) span across the entire area of each window, and (iii) define a hermetic seal between the boundary of each window and the layer of the second heat-sealable plastic material;
   wherein the layer of extruded thermoplastic and the layer of heat-sealable plastic material permit the contents of a package produced from the laminate to be viewed; and
   wherein the second heat-sealable plastic material is a multi-layer heat-sealable plastic material including a barrier film and a sealant film.

2. A laminate according to claim 1, wherein the layer of the second heat-sealable plastic material is extrusion laminated to the layer of the first material by a laminator having a roll bearing a textured surface such that the one or more windows: (i) include a substantially reverse impression of the textured surface of the roll, and (ii) are translucent due to the substantially reverse impression of the textured surface of the roll.

3. A laminate according to claim 2, wherein the roll is a chill roll and the textured surface is a mirror pocket finish.

4. A laminate according to claim 1, wherein the first material is selected from the group consisting of paper, film, foil and a lamination containing paper, film or foil.

5. A heat-sealed package, said package comprising:
an outer layer of a first material, said outer layer having formed therein one or more holes;
an inner layer of a heat-sealable second plastic material spaced from the outer layer; and
an intermediate layer of extruded thermoplastic between the inner and outer layers such that the one or more holes are hermetically sealed by plastic; and
wherein the intermediate layer of extruded thermoplastic extends on top of the inner layer to: (i) continuously connect the inner and outer layers, (ii) span across the entire area of each hole, and (iii) define a hermetic seal between the boundary of each hole and the inner layer;
wherein the layer of heat-sealable second plastic material and the layer of extruded thermoplastic permit the contents of the package to be viewed; and
wherein the heat-sealable second plastic material is a multi-layer heat-sealable plastic material including a barrier film and a sealant film.

6. A package according to claim 5, wherein the inner layer is extrusion laminated to the outer layer by a laminator having a roll bearing a textured surface such that the one or more holes: (i) include a substantially reverse impression of the textured surface of the roll, and (ii) are translucent due to the substantially reverse impression of the textured surface of the roll.

7. A package according to claim 6, wherein the roll is a chill roll and the textured surface is a mirror pocket finish.

8. A package according to claim 5, wherein the heat-sealable second plastic material has barrier qualities.

9. A laminate according to claim 1, wherein the layer of first material includes a print-bearing surface that faces away from the layer of second material.

10. A laminate for forming a package having one or more windows for viewing the contents of said package, said laminate comprising:

a layer of a first material having formed therein a hole for and defining each of said one or more windows;
a layer of a second heat-sealable plastic material spaced from the layer of first material; and
a layer of extruded thermoplastic between the layer of the first material and the layer of the second heat-sealable plastic material such that the one or more windows are hermetically sealed by plastic;
wherein the layer of extruded thermoplastic extends on top of the layer of the second heat-sealable plastic material to: (i) continuously connect the first and second layers, (ii) span across the entire area of each window, and (iii) define a hermetic seal between the boundary of each window and the layer of the second heat-sealable plastic material;
wherein the layer of heat-sealable second plastic material and the layer of extruded thermoplastic permit the contents of the package to be viewed;
wherein the second heat-sealable plastic material is a multi-layer heat-sealable plastic material including a barrier film and a sealant film;
wherein the layer of the second heat-sealable plastic material is extrusion laminated to the layer of first material by a laminator having a roll bearing a textured surface such that the one or more windows: (i) include a substantially reverse impression of the textured surface of the roll, and (ii) are translucent due to the substantially reverse impression of the textured surface of the roll;
wherein the roll is a chill roll and the textured surface is a mirror pocket finish; and
wherein the first material includes a print-bearing surface that faces away from the layer of the second heat-sealable plastic material.

11. A laminate according to claim 10, wherein the first material is selected from the group consisting of paper, film, foil and a lamination containing paper, film or foil.

* * * * *